US006962660B2

(12) United States Patent
Wybo

(10) Patent No.: US 6,962,660 B2
(45) Date of Patent: Nov. 8, 2005

(54) FLUID FILTER SYSTEM WITH SECONDARY FLOW PATH FOR AUGMENTED FILTRATION

(75) Inventor: Paul Wybo, Fort Wayne, IN (US)

(73) Assignee: Master Spas, Inc., Ft. Wayne, IN (US)

( * ) Notice: Subject to any disclaimer, the term of this patent is extended or adjusted under 35 U.S.C. 154(b) by 0 days.

(21) Appl. No.: 10/254,893

(22) Filed: Sep. 25, 2002

(65) Prior Publication Data
US 2004/0055939 A1  Mar. 25, 2004

(51) Int. Cl.[7] .......................... B01D 29/58; C02F 1/50; E04H 4/16
(52) U.S. Cl. .................. 210/315; 210/416.1; 210/460; 210/489; 210/493.2; 210/501; 210/503
(58) Field of Search .............................. 210/232, 314, 210/315, 459, 460, 416.1, 489, 502, 497.01, 210/437, 493.1, 493.2, 504, 506, 503, 169

(56) References Cited

U.S. PATENT DOCUMENTS

| | | | | |
|---|---|---|---|---|
| 1,011,482 | A | * | 12/1911 | Pemberton .................. 210/437 |
| 1,140,726 | A | * | 5/1915 | Warden ...................... 210/338 |
| 2,782,933 | A | * | 2/1957 | Monsarrat ................... 210/460 |
| 2,785,805 | A | * | 3/1957 | Hough ....................... 210/295 |
| 3,152,077 | A | | 10/1964 | Kryzer ....................... 210/233 |
| 3,178,024 | A | | 4/1965 | Jacuzzi ....................... 210/253 |
| 3,295,680 | A | * | 1/1967 | Wilber ....................... 210/130 |
| 3,295,681 | A | * | 1/1967 | Rubert et al. ............... 210/169 |
| 3,303,933 | A | * | 2/1967 | Huff .......................... 210/441 |
| 3,457,339 | A | * | 7/1969 | Pall et al. ................... 264/162 |
| 3,474,817 | A | | 10/1969 | Bates et al. ................. 137/268 |
| 3,540,592 | A | | 11/1970 | Derreumaux ................ 210/169 |
| 3,664,095 | A | * | 5/1972 | Asker et al. .................. 96/154 |
| 3,715,037 | A | * | 2/1973 | Hu et al. ..................... 210/501 |
| 3,842,870 | A | | 10/1974 | Burgess ...................... 141/286 |
| 3,950,251 | A | | 4/1976 | Hiller ......................... 210/232 |
| 3,977,967 | A | | 8/1976 | Trulson et al. ............ 210/23 F |
| 4,416,854 | A | | 11/1983 | Nielsen ........................ 422/29 |
| 4,584,106 | A | | 4/1986 | Held .......................... 210/754 |
| 4,610,783 | A | | 9/1986 | Hudson ...................... 210/169 |
| 4,642,192 | A | | 2/1987 | Heskett ....................... 210/638 |
| 4,704,202 | A | | 11/1987 | Poyner ....................... 210/108 |
| 4,752,401 | A | | 6/1988 | Bodenstein ................. 210/746 |
| 4,773,998 | A | | 9/1988 | Heinrich ..................... 210/288 |
| 4,783,271 | A | * | 11/1988 | Silverwater ................. 210/742 |
| 4,909,937 | A | * | 3/1990 | Hoffmann et al. .......... 210/315 |
| 4,936,979 | A | | 6/1990 | Brown ......................... 210/85 |

(Continued)

FOREIGN PATENT DOCUMENTS

JP              5-15744 A   *   1/1993

*Primary Examiner*—Fred G. Prince
(74) *Attorney, Agent, or Firm*—Synnestvedt & Lechner LLP

(57) ABSTRACT

A filter system for spas and swimming pools is disclosed having a primary filter containing a porous membrane made of multiple plies. A fluid purifying medium in the form of irregularly shaped copper and zinc alloy particles is captured between the plies and placed in contact with the spa water to kill bacteria and remove heavy metals, precipitates and chlorine as the water cycles through the filter. A micro filter for filtering particles surrounds the primary filter, the micro filter and primary filter are mounted in a chamber in fluid communication with the spa or pool. Another particulate filter is positioned upstream of the micro filter and primary filter. A secondary micro filter and primary filter provide filter capacity augmentation through a parallel flow path during periods of increased demand.

16 Claims, 4 Drawing Sheets

U.S. PATENT DOCUMENTS

| | | | |
|---|---|---|---|
| 4,950,400 A * | 8/1990 | Girondi | 210/335 |
| 4,956,089 A * | 9/1990 | Hurst | 210/484 |
| 4,986,906 A | 1/1991 | Dadisman | 210/169 |
| 5,008,011 A | 4/1991 | Underwood | 210/232 |
| 5,017,286 A | 5/1991 | Heiligman | 210/266 |
| 5,081,954 A | 1/1992 | Monus | 119/3 |
| 5,092,990 A * | 3/1992 | Muramatsu et al. | 210/136 |
| 5,092,993 A | 3/1992 | Goodwin | 210/202 |
| 5,102,539 A | 4/1992 | Siegfried | 210/193 |
| 5,118,655 A | 6/1992 | Pedersen | 502/412 |
| 5,122,274 A | 6/1992 | Heskett | 210/638 |
| 5,135,654 A | 8/1992 | Heskett | 210/638 |
| 5,149,437 A | 9/1992 | Wilkinson et al. | 210/665 |
| 5,152,464 A | 10/1992 | Farley | 239/553.3 |
| 5,190,659 A | 3/1993 | Wang et al. | 210/663 |
| 5,198,118 A | 3/1993 | Heskett | 210/638 |
| 5,236,595 A | 8/1993 | Wang et al. | 210/669 |
| 5,269,926 A | 12/1993 | Webster et al. | 210/500.25 |
| 5,269,932 A | 12/1993 | Heskett | 210/638 |
| 5,275,737 A | 1/1994 | Heskett | 210/638 |
| 5,275,743 A * | 1/1994 | Miller et al. | 210/767 |
| 5,279,748 A | 1/1994 | Hackett | 210/757 |
| 5,314,623 A | 5/1994 | Heskett | 210/638 |
| 5,415,770 A | 5/1995 | Heskett | 210/202 |
| 5,433,856 A | 7/1995 | Heskett | 210/638 |
| 5,492,623 A | 2/1996 | Ishibe | 210/232 |
| 5,510,034 A | 4/1996 | Heskett | 210/638 |
| 5,593,574 A | 1/1997 | VanToever | 210/150 |
| 5,599,454 A | 2/1997 | Heskett | 210/638 |
| 5,605,631 A | 2/1997 | Barri et al. | 210/650 |
| 5,665,228 A | 9/1997 | Leaverton et al. | 210/169 |
| 5,674,393 A * | 10/1997 | Terhune et al. | 210/315 |
| 5,759,400 A * | 6/1998 | Fanning | 210/510.1 |
| 5,788,858 A | 8/1998 | Acernese et al. | 210/257.2 |
| 5,830,360 A * | 11/1998 | Mozayeni | 210/651 |
| 5,833,859 A | 11/1998 | Heskett | 210/638 |
| 5,837,134 A | 11/1998 | Heskett | 210/175 |
| 5,882,512 A | 3/1999 | Denkewicz, Jr. et al. | 210/169 |
| D411,282 S | 6/1999 | King | D23/209 |
| 5,951,869 A | 9/1999 | Heskett | 210/638 |
| 5,980,759 A * | 11/1999 | Proulx et al. | 210/767 |
| 5,997,812 A | 12/1999 | Burnham et al. | 422/24 |
| D422,678 S | 4/2000 | King | D23/209 |
| 6,093,422 A | 7/2000 | Denkewicz, Jr. et al. | 424/618 |
| 6,123,841 A | 9/2000 | Gotoh | 210/169 |
| 6,156,211 A * | 12/2000 | Gonzalez-Martin et al. | 210/748 |
| 6,165,358 A | 12/2000 | Denkewicz, Jr. et al. | 210/167 |
| 6,190,547 B1 | 2/2001 | King et al. | 210/169 |
| 6,200,487 B1 | 3/2001 | Denkewicz, Jr. et al. | 210/749 |
| 6,217,780 B1 | 4/2001 | Denkewicz, Jr. et al. | 210/764 |
| 6,238,631 B1 | 5/2001 | Ogata et al. | 422/186.3 |
| 6,254,894 B1 | 7/2001 | Denkewicz, Jr. et al. | 424/618 |
| 6,312,604 B1 | 11/2001 | Denkewicz, Jr. et al. | 210/728 |
| 6,352,111 B1 * | 3/2002 | Bode et al. | 166/265 |
| 6,550,622 B2 * | 4/2003 | Koslow | 210/490 |

\* cited by examiner

FLUID FILTER SYSTEM WITH SECONDARY FLOW PATH FOR AUGMENTED FILTRATION

FIELD OF THE INVENTION

This invention relates to fluid filters and filter systems, and especially to filters and filter systems for filtering water in spas, swimming pools, hot tubs and whirlpools.

BACKGROUND OF THE INVENTION

Filter systems used in swimming pools, spas, hot tubs and whirlpools often rely on particulate filters, such as sand beds, to trap and remove particulate contaminants from the water and chlorine of sufficient concentration in the water to kill harmful bacteria, algae and fungus which may inhabit the water.

Such systems suffer several disadvantages. For example, the particulate filter must be periodically back-flushed to clear it of accumulated debris, often requiring that the filter system be taken down for a period of time during the back-flushing. The most objectionable disadvantage is the use of chlorine to kill harmful bacteria in the water, however. Chlorine in the water causes a strong chlorine odor to permeate the area around the pool or spa. This odor becomes especially objectionable when the spa or pool is located indoors, because the odor becomes concentrated and the area must be ventilated to keep the chlorine odors down. Chlorine furthermore attacks certain plastics and fibers, causing deterioration and bleaching of pool or spa accessories, as well as swimming or spa apparel. Users of the pool or spa must shower or bathe to rid themselves of the chlorine odor after each use of the pool or spa.

There is clearly a need for filters and a filter system that substantially reduces or even eliminates entirely the use of chlorine to maintain safe, filtered water, free of harmful bacteria in spas or pools and which does not require extensive maintenance, such as back-flushing.

SUMMARY AND OBJECTS OF THE INVENTION

The invention concerns a filter unit positionable in a fluid stream upstream of a conduit in a filter system for filtering a fluid. The filter unit comprises a primary filter element having a porous filter membrane surrounding a central space. The primary filter element comprises spaced, non-porous ends, open side portions, an opening in one of the ends and a closure at the end opposite to the opening. The porous filter membrane is disposed between the ends and the fluid stream flows through the open side portions. The membrane carries a particulate fluid purifying medium. A connector surrounds the opening for connecting the primary filter element to the conduit, thereby establishing a fluid flow path extending through the porous filter membrane to the conduit, whereby the fluid is brought into contact with the particulate fluid purifying medium. The particulate fluid purifying medium preferably comprises particles formed of an alloy of copper and zinc.

Preferably, the filter unit also comprises a micro filter having a porous filter membrane circumferentially disposed about an interior space. The micro filter has open ends for receiving the primary filter element within the interior space and a pair of sealing surfaces respectively positioned at each end of the micro filter. One of the sealing surfaces is for sealingly mounting the micro filter within the filter system for establishing fluid communication through the porous filter membrane and into the interior space, and the other of the sealing surfaces is engageable with the closure for sealingly joining the micro filter and the primary filter element together.

The invention also concerns a filter system for filtering a fluid in a reservoir. The filter system comprises a chamber in fluid communication with the reservoir and a primary filter element positioned within the chamber. The primary filter element has a porous filter membrane surrounding a central space and comprises spaced, non-porous ends and open side portions. An opening is positioned in one of the ends and a closure is positioned at the end opposite to the opening. The porous membrane is disposed between the ends and a connector is mounted at the open end of the primary filter element.

The filter system also comprises a conduit having a first end sealingly connected to the connector, thereby establishing fluid communication between the conduit and the central space. The conduit also has a second end in fluid communication with the reservoir. The conduit establishes a closed flow path from the reservoir through the chamber, through the porous filter membrane and the central space, through the conduit and back to the reservoir. A pump for pumping the fluid over the closed flow path is also included.

Preferably, the filter system also comprises a micro filter positioned within the chamber. The micro filter comprises a porous filter membrane surrounding an interior space, the micro filter having open ends for receiving the primary filter element within the interior space. A pair of sealing surfaces are respectively positioned at each end of the micro filter, one of the sealing surfaces for sealingly mounting the micro filter within the chamber for establishing fluid communication through the micro filter and into the interior space, the other of the sealing surfaces being engageable with the closure for sealingly joining the primary and micro filters together. The fluid flows from the reservoir into the chamber, through the micro filter, through the primary filter element, through the conduit and back to the reservoir. The system also preferably includes a macro filter positioned in the chamber between the reservoir and the micro filter.

The filter system may also include a secondary filter element positioned within the chamber. The secondary filter element has a second porous filter membrane surrounding a second central space with spaced, non-porous ends, open side portions, an opening in one of the ends and a closure at the end opposite to the opening. The second porous filter membrane is disposed between the non-porous ends. A second connector is mounted at the open end of the secondary filter element and is attachable to a second conduit. The second conduit has a first end sealingly connected to the second connector, thereby establishing fluid communication between the second conduit and the second central space. The second conduit also has a second end in fluid communication with the reservoir for establishing a secondary closed flow path from the reservoir through the chamber, through the second porous filter membrane, through the second central space and back to the reservoir. An auxiliary pump is preferably positioned in fluid communication with the second conduit for pumping fluid through the secondary flow path.

The filter system further comprises a second micro filter positioned within the chamber. The second micro filter has a porous filter membrane surrounding a second interior space, open ends for receiving the secondary filter element within the second interior space, and a second pair of sealing surfaces respectively mounted at each end of the second micro filter. One of the second sealing surfaces is for sealingly mounting the second micro filter within the chamber for establishing fluid communication through the second micro filter and into the second interior space. The other of the second sealing surfaces is engageable with the closure on the secondary filter element for sealingly joining the second micro filter and the secondary filter element together. The secondary flow path is defined from the reservoir into the chamber, through the second micro filter, through the secondary filter element, through the second conduit and back to the reservoir.

The invention also contemplates a filter comprising membrane formed of a plurality of porous plies and a particulate fluid purifying medium comprising particles captured between at least two of the plies. Preferably, the plies comprise a fibrous material and the particulate fluid purifying medium comprises particles formed of an alloy of copper and zinc. The particles have irregular shapes to increase their surface area contact with the fluid being filtered.

It is an object of the invention to provide a filter system for filtering water in spas, pools, hot tubs and whirlpools.

It is another object of the invention to provide a filter system for filtering water which kills bacteria in the water being filtered without the use of chlorine.

It is another object of the invention to provide a filter system which removes heavy metals from water.

It is yet another object of the invention to provide a filter system which removes precipitates from the water.

It is still another object of the invention to provide a filter system which removes chlorine from the water.

It is again another object of the invention to provide a filter system having filter elements which are readily removable for ease of replacement as they become ineffective.

It is yet again another object of the invention to provide a filter system having a secondary flow path for augmenting the filtering capacity of the system on demand as necessary.

These and other objects and advantages of the invention will become apparent upon consideration of the following drawings and detailed description of the preferred embodiments of the invention.

DETAILED DESCRIPTION OF THE PREFERRED EMBODIMENTS

Figure 1:
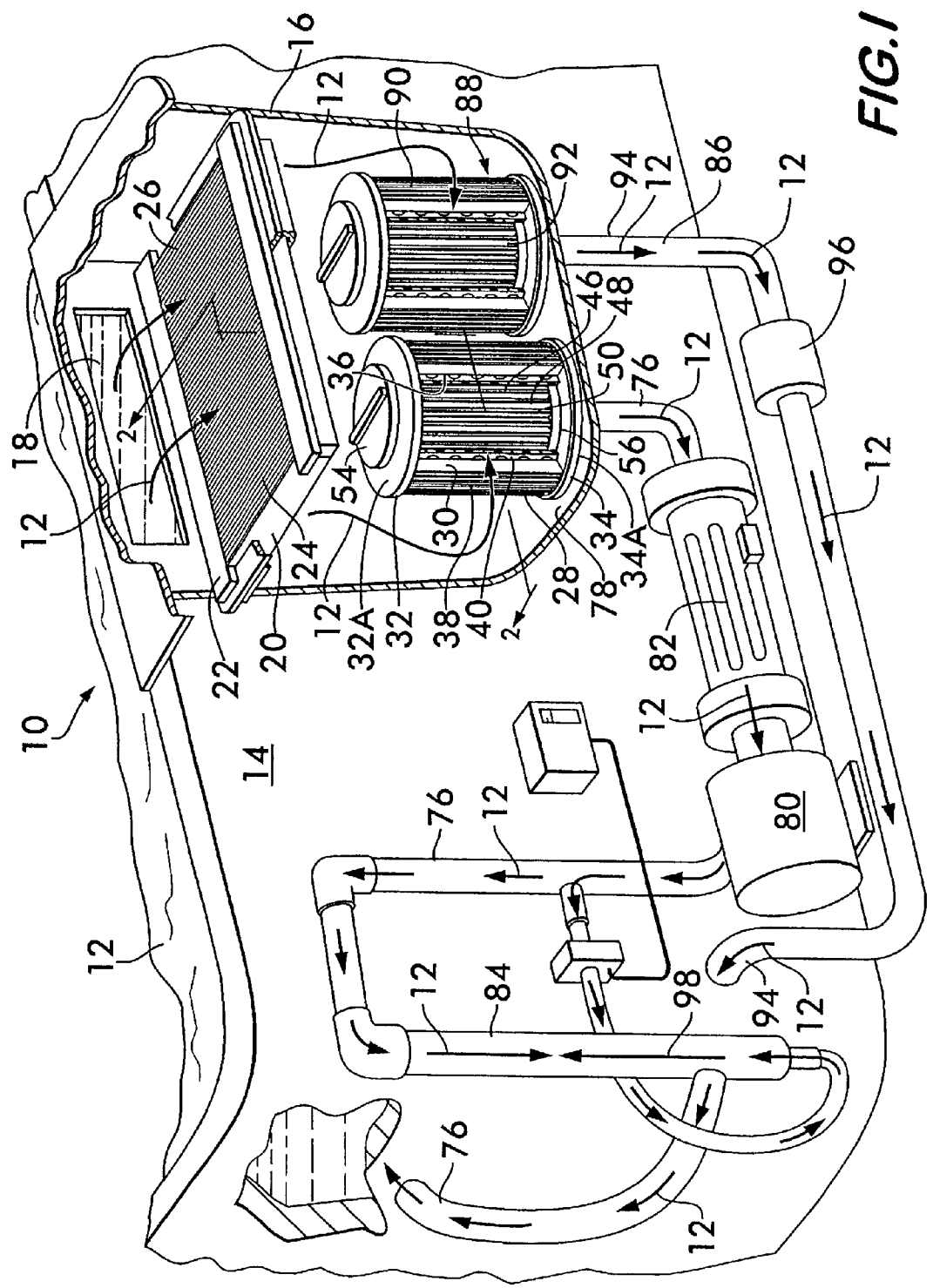
FIG. 1 is a partial cut-away perspective view of a filter system according to the invention.

FIG. 1 shows a filter system 10 according to the invention for filtering fluid 12 in a reservoir 14. Fluid 12 may, for example, be water, and reservoir 14 may be a swimming pool, a spa, a hot tub, a whirlpool or other body of fluid. Filter system 10 comprises a chamber 16 in fluid communication with the reservoir 14, preferably through an opening 18 in the reservoir which allows fluid from the reservoir to flow directly into the chamber.

The filter system 10 may have a macro filter 20 positioned within the chamber 16 adjacent to opening 18 for filtering the fluid immediately upon entering the chamber. Macro filter 20 comprises a non-porous frame 22 which mounts sealingly within the chamber 16 and supports a porous filter membrane 24. Membrane 24 is preferably comprised of a fibrous material such as woven polyester fibers or non-woven polyester felt and is reverse folded in a plurality of pleats 26 as best shown in the cross section of FIG. 2 to provide increased surface area within the perimeter of frame 22. Greater surface area provides a longer life for the macro filter 20 and reduces the interval at which it must be replaced as it becomes clogged with debris. Frame 22 is removably mounted within the chamber 16 to facilitate changing the macro filter as required. The porosity of membrane 24 is designed to trap particulate matter down to 40 microns in size while allowing the fluid 12 to pass through.

Figure 2:
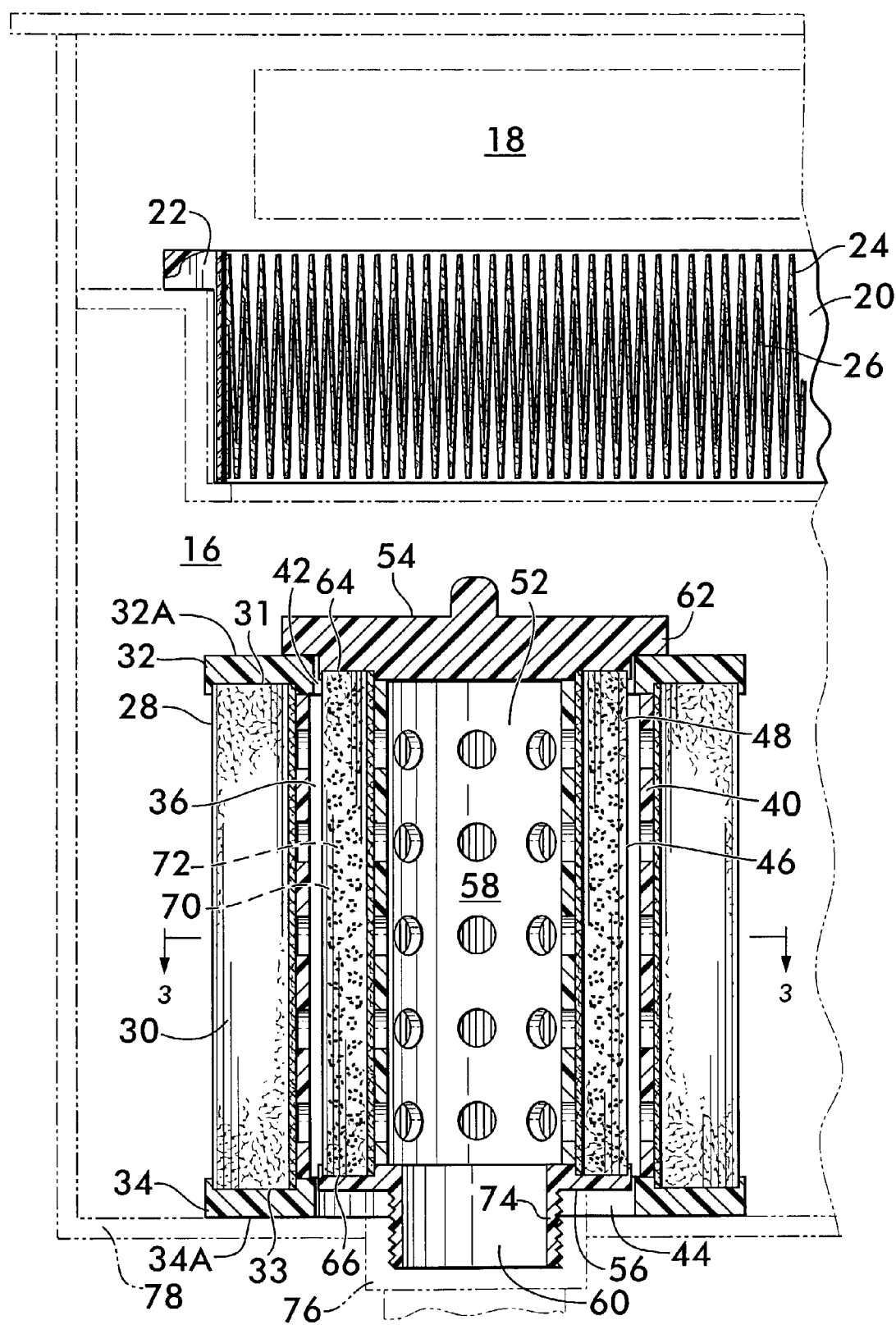
FIG. 2 is a partial sectional view taken along lines 2—2 of FIG. 1.
Figure 3:
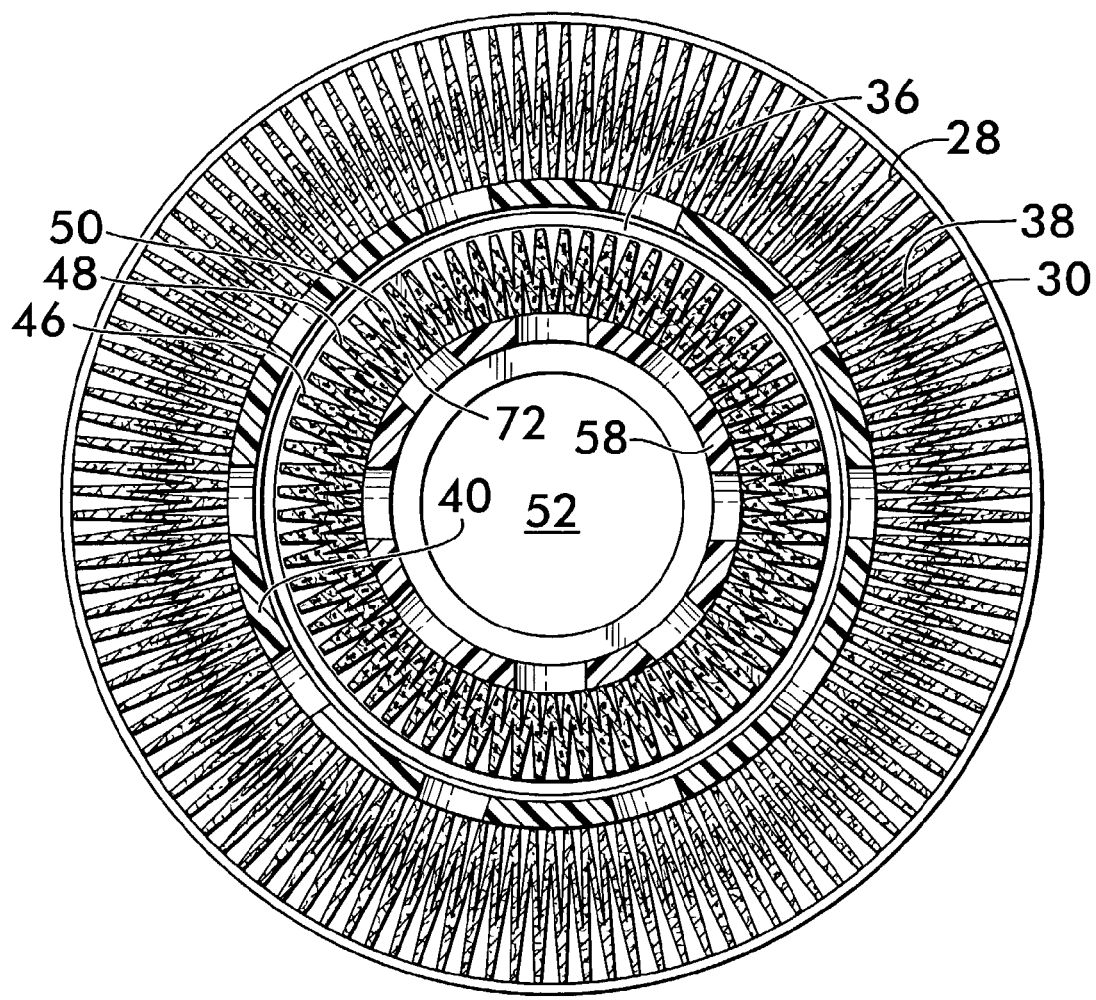
FIG. 3 is a sectional view taken along lines 3—3 of FIG. 2.

As shown in FIGS. 1 and 2, a micro filter 28 is positioned within chamber 16 downstream of the macro filter 20. Preferably, micro filter 28 is cylindrical in shape and comprises a porous filter membrane 30 attached between two non-porous ends 32 and 34. End 32 forms an upper sealing surface 32a, and end 34 forms a lower sealing surface 34a. The micro filter 28 surrounds an interior space 36. Membrane 30 is preferably made of a fibrous material such as polyester fibers (for example woven or as a non-woven felt), and, as shown in cross-section in FIG. 3, is folded into a plurality of pleats 38 extending lengthwise along the micro filter, the pleats providing increased surface area and longer filter life. Membrane 30 has a porosity designed to trap particles as small as 20 microns in size. As shown in FIGS. 1 and 2, a perforated support tube 40 is positioned within the interior space 36 and is attached at its ends to the ends 32 and 34. Perforated support tube 40 provides radial support to the membrane 30 and keeps the sealing surfaces 32 and 34 in spaced relation at either end of the micro filter 28. Preferably, the ends 32 and 34 are formed from a polymer resin such as polyurethane and the ends 31 and 33 of the membrane 30 are attached to the ends 32 and 34 by embedding them into the resin. This ensures a fluid tight joint between the membrane 30 and the ends 32 and 34 in order to define a flow path through the membrane 30, thereby forcing all of the fluid through the membrane and preventing any bypass of unfiltered fluid in the regions of the sealing surfaces 32a and 34a and ends 31 and 33 of the membrane.

As shown in FIG. 2, ends 32 and 34 have openings 42 and 44 permitting a primary filter element 46 to be installed within interior space 36. As shown in FIGS. 2 and 3, primary filter element 46 comprises a porous filter membrane 48, preferably cylindrical in shape and having pleated folds 50 to increase its surface area for increased filter life, as well as other reasons described below. The porous filter membrane 48 surrounds a central space 52 and is sealed to spaced, non-porous ends 54 and 56. The sides of the primary filter are open allowing fluid to flow through the membrane 48. A perforated support tube 58 is attached between ends 54 and 56. Tube 58 provides radial support to membrane 48 and maintains the ends 54 and 56 in spaced relation. As best shown in FIG. 2, an opening 60 is positioned in the end 56 providing fluid communication with the central space 52. The opposite end 54 forms a closure with a radially extending flange 62. Preferably, the ends 54 and 56 as well as flange 62 are formed of a polymer resin such as polyurethane. The ends 64 and 66 of the membrane 48 are embedded within the resin to define the flow path though the membrane 48 and to prevent bypass of unfiltered fluid in the regions of the ends 54 and 56 of the primary filter 46.

Figure 4:
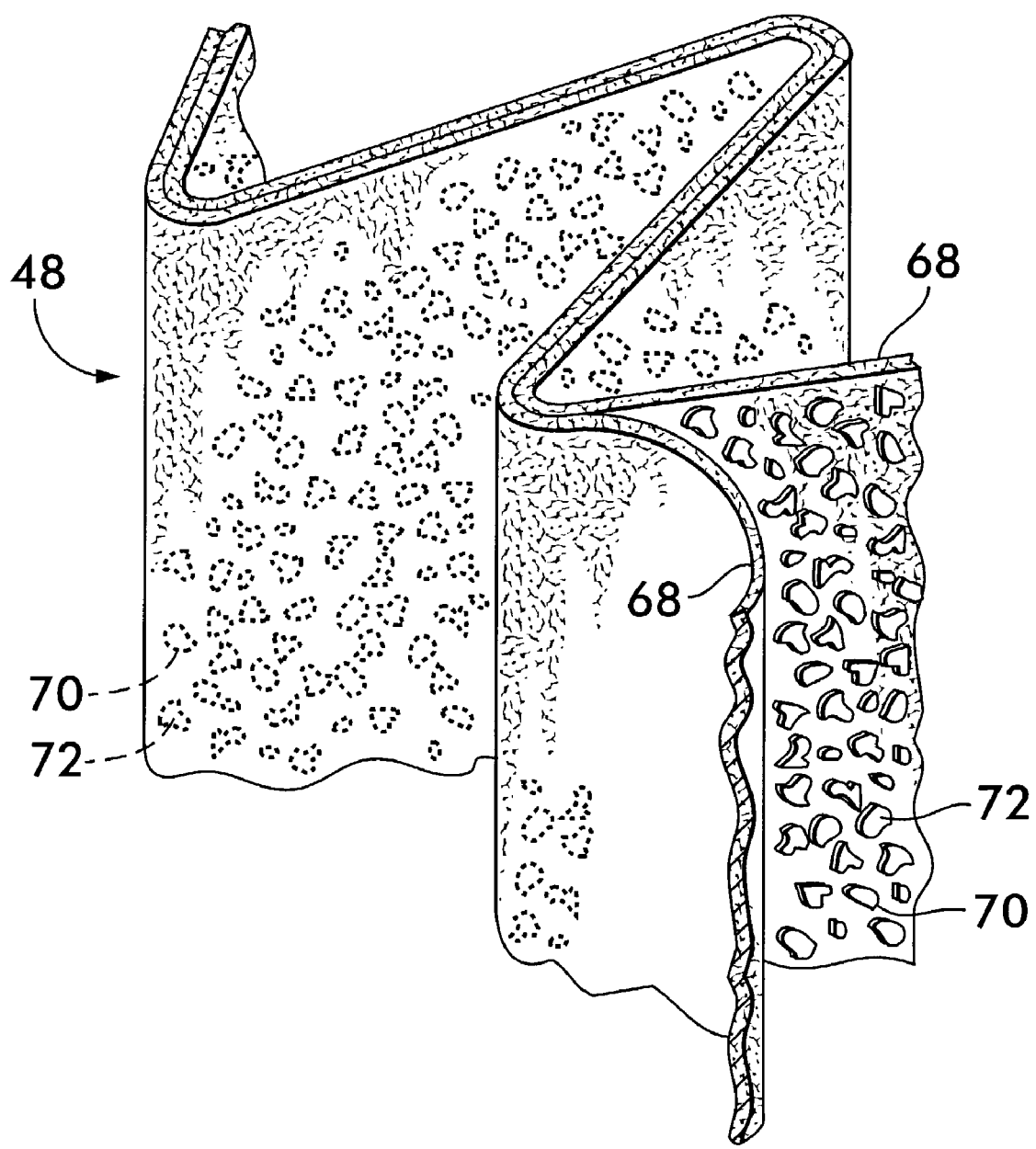
FIG. 4 is a perspective view of a portion of porous filter membrane.

As shown in FIG. 4, the porous filter membrane 48 of primary filter element 46 preferably comprises a plurality of plies 68 of fibrous material such as layers of woven polyester fibers or non-woven polyester felt laminated together. A particulate fluid purifying medium 70 is captured between at least two of the plies 68. Porous filter membrane 48 is formed preferably by distributing the medium 70 over the surface of one of the plies 68, overlaying another ply over the surface and then pressing the plies forcibly together to form the ply laminate. Preferably, the medium 70 comprises irregularly shaped particles 72 formed of an alloy of copper and zinc as described in U.S. Pat. Nos. 5,135,654; 5,198,118 and 5,314,623, all to Heskett, and hereby incorporated by reference.

In operation, the medium 70 creates an electrochemical reaction in the spa water known as an oxidation-reduction reaction as the water passes through the filter membrane 48 and contacts the medium. The metal alloy comprising the medium 70 exchanges valence electrons with other elements and compounds in the water thereby changing the water chemistry and creating an environment which is deadly to some microorganisms and which interferes with the ability of many microorganisms to reproduce. Thus the oxidation-reduction reactions effected by the medium 70 kill algae, fungi, and bacteria. The reactions also remove undesired compounds such as calcium carbonate and hydrogen sulfide from the water. The medium 70 helps stabilize the pH of the water and removes heavy metals such as copper, lead and mercury, which tend to plate onto the surface of the medium 70. Free chlorine is converted into a water-soluble chloride, thereby providing safe, odor-free water in a spa or pool.

The particles 72 are randomly distributed throughout the filter membrane 48 to provide a substantially uniform particle distribution. Pleats 50 in the membrane allow an increased amount of the particles 72 to be carried by the primary filter element 46. The irregular shapes of the particles 72 provide a greater contact surface area between the fluid 12 and the purifying medium 70, thus, providing for efficient use of the medium. Preferably, the primary filter element carries about 500 grams of the purifying medium 70, the size of the particles being known commercially as "KDF fine".

With reference to FIG. 1, the micro filter 28 and the primary filter element 46 are removably mounted within the chamber 16 to facilitate changing of the filter elements as necessary. Removable mounting of the filter elements is accomplished by a connector, preferably in the form of a threaded collar 74 (see FIG. 2) surrounding the opening 60 in end 56 of primary filter element 46. The collar 74 extends coaxially from the end 56 and is sealingly engageable with a threaded conduit 76 which leads from the bottom 78 of chamber 16 back to the reservoir 14 as shown in FIG. 1. The micro filter 28 is positioned on the bottom 78 of chamber 16 so that the opening 44 in end 34 is overlying the conduit 76, and the lower sealing surface 34*a* engages the bottom 78. The primary filter element 46 is received within the interior space 36 of the micro filter 28, and the threaded collar 74 passes through opening 44 and engages the conduit 76. The primary filter element 46 is secured by screw action of the collar 74 to the conduit 76. The flange 62 of closure 54 cooperates with upper sealing surface 32*a* of micro filter 28 to close off access to the interior space 36. The screw action of collar 74 also causes flange 62 to compress the lower sealing surface 34*a* against the bottom 78 of the chamber 16, the micro filter 28 being captured between flange 62 and the bottom 78 of chamber 16. Together, the closure 54, flange 62, upper sealing surface 32*a*, lower sealing surface 34*a* and threaded collar 74 define the fluid flow path through the porous membrane 30 of micro filter 28 and then through the porous membrane 48 of primary filter element 46, bringing the fluid 12 into contact with the fluid purifying medium 70. Using the threaded collar 74 allows both the micro filter 28 and primary filter element 46 to be readily removed from chamber 16 and replaced when new filter elements are required.

As shown in FIG. 1, a pump 80 is located downstream of the chamber 16 in fluid communication with conduit 76. The pump draws fluid from the reservoir 14, through the various filter elements described above and returns the fluid to the reservoir through the conduit 76, which defines a closed fluid flow path from the reservoir through the filter system and back to the reservoir. It is advantageous to position the pump downstream of the filter elements 20, 28 and 46 because filtered fluid is less likely to foul the pump or damage its moving parts, such as the impeller.

A heater 82 is also in fluid communication with the conduit 76 for maintaining a desired temperature within the spa or pool. The conduit 76 may also be operatively associated with an ozone tower 84 for injecting ozone into the fluid stream for further purification before the fluid is returned to the reservoir 14.

During times of peak demand on the filter system 10, a secondary flow path 86 through a set of secondary filters 88 is provided to augment the system's filtering capacity. Preferably, the secondary filters 88 comprise a second micro filter 90 positioned within chamber 16 downstream of the macro filter 20 and a secondary filter 92 positioned within the micro filter 90. The second micro filter 90 and secondary filter 92 are substantially identical in construction and operation, respectively, to the micro filter 28 and the primary filter 46 described above. The secondary filter is connected to a second conduit 94 which defines the secondary flow path 86 from the chamber 16, through the secondary filters 88 and back to the reservoir 14.

Filter System Operation

With reference to FIG. 1, fluid, indicated by arrows 12, flows from reservoir 14 (which may be a pool, spa, whirlpool or the like) through opening 18 and into chamber 16. Opening 18 is preferably located at the fluid surface of the reservoir 14 so as to skim any floating debris into the filter system. Fluid 12 encounters macro filter 20, wherein particles 40 microns and larger are separated from the fluid. The fluid 12 then passes through micro filter 28 which removes particles as small as 20 microns. The fluid then passes through primary filter 46 and contacts the fluid purifying medium 70 distributed between the plies 68 of the porous filter membrane 48 (see FIG. 4). The fluid continues on through conduit 76 and into heater 82, through pump 80 and then through the ozone tower 84 where ozone 98 is injected in a counterflow regime to further purify fluid 12. Conduit 76 continues on to return the fluid 12 to reservoir 14. When used in a spa, fluid is pumped continuously by pump 80 through the flow path defined by macro filter 20, micro filter 30, primary filter 46 and conduit 76.

At times of peak or increased demand on the filter system 10, an auxiliary pump 96 is activated to provide increased filtering capacity through a secondary flow path 86. Pump 96 is in fluid communication with conduit 94 and pumps fluid 12 through the second micro filter 90 and the secondary filter 92 (where the fluid further contacts fluid purifying medium 70) and on through the second conduit 94 and back to the reservoir 14. When the filter system 10 is used in a spa, it is advantageous to operate auxiliary pump 96 for short periods twice a day, and continuously when the spa is in use and thus demand for fluid filtration is increased.

Use of the filters and filter system according to the invention for spas and pools provides a convenient and effective alternative to chlorine based filter systems and avoids their disadvantages, such as the associated chlorine odor and the deterioration and bleaching of items such as swimming apparel worn in the pool or spa. The filter elements in the system according to the invention are readily replaceable as necessary to maintain the pool or spa safe and clean, and the secondary system provides for augmented filter capacity on demand to ensure that the water in the pool or spa remains safe and free of bacteria, algae, fungi, heavy metals, precipitates and other undesired contaminants.

What is claimed is:

1. A filter unit positionable in a fluid stream upstream of a conduit in a filter system for filtering a fluid, said filter unit comprising:
   a primary filter element having a porous filter membrane surrounding a central space, said primary filter element comprising spaced, non-porous ends, open side portions and an opening in one of said ends, said porous filter membrane being disposed between said ends in the fluid stream flowing through said open side portions, and carrying a particulate fluid purifying medium comprising irregularly shaped metal particles formed of an alloy of copper and zinc; and
   a connector surrounding said opening for connection to said conduit, thereby establishing a fluid flow path extending through said porous filter membrane to said conduit, whereby said fluid is brought into contact with said particulate fluid purifying medium.

2. A filter unit according to claim 1, further comprising:
   a micro filter having a porous filter membrane circumferentially disposed about an interior space, said micro filter having open ends for receiving said primary filter element within said interior space; and
   a pair of sealing surfaces respectively positioned at each end of said micro filter, one of said sealing surfaces for sealingly mounting said micro filter within said filter system for establishing fluid communication through said porous filter membrane and into said interior space, the other of said sealing surfaces being engageable with another of said ends of said primary filter opposite said opening for sealingly joining said micro filter and said primary filter element together.

3. A filter unit according to claim 1, wherein said particulate fluid purifying medium is substantially randomly distributed throughout said porous filter membrane.

4. A filter unit according to claim 1, wherein said porous filter membrane comprises a plurality of plies laminated together, said particulate fluid purifying medium being captured between at least two of said plies.

5. A filter unit according to claim 4, wherein said porous filter membrane is folded into a plurality of pleats.

6. A filter unit according to claim 1, further comprising a perforated tube positioned between said non-porous ends, said porous filter membrane surrounding said perforated tube, said perforated tube supporting said porous filter membrane radially and maintaining said non-porous ends in spaced relation.

7. A filter unit according to claim 6, wherein said non-porous ends are formed of a polymer resin, said porous filter membrane having oppositely disposed end regions, each of said end regions being embedded within said resin in a respective one of said non-porous ends, thereby attaching said porous filter membrane to said ends.

8. A filter unit positionable upstream of a conduit in a filter system for filtering a fluid, said filter unit comprising:
   an inner filter element having a first porous filter membrane surrounding a central space, said inner filter element having an open end providing access to said central space and a closure mounted opposite said open end and forming a closed end;
   a connector mounted at said open end of said inner filter element for connection to said conduit and establishing fluid communication between said central space and said conduit;
   an outer filter element having a second porous filter membrane surrounding an interior space, one of said first and second porous filter membranes carrying a fluid purifying medium comprising irregularly shaped metal particles formed of an alloy of copper and zinc, said outer filter element having open ends for receiving said inner filter element within said interior space; and
   a pair of sealing surfaces respectively positioned at each end of said outer filter element, one of said sealing surfaces for sealingly mounting said outer filter element within said filter system for establishing fluid communication through said second porous filter membrane and into said interior space, the other of said sealing surfaces being engageable with said closure for sealingly joining said inner and outer filter elements together at said closed end.

9. A filter unit according to claim 8, wherein said first and second porous filter membranes comprise a fibrous material.

10. A filter unit according to claim 9, wherein one of said porous filter membranes comprises a plurality of plies laminated together.

11. A filter unit according to claim 10, wherein said one porous filter membrane carries said particulate fluid purifying medium distributed between two of said plies.

12. A filter unit according to claim 8, wherein said one porous filter membrane is folded into a plurality of pleats.

13. A filter unit according to claim 12, wherein said one porous filter membrane is said first porous filter membrane comprising said inner filter element.

14. A filter unit according to claim 8, wherein said connector further comprises means for removably mounting said inner filter element into fluid communication with said conduit.

15. A filter unit according to claim 14, wherein said connector comprises a threaded collar extending from said open end of said inner filter element, said threaded collar being engageable with mating threads on said filter system.

16. A filter unit according to claim 8, further comprising a first perforated tube positioned between said non-porous ends of said inner filter element, and a second perforated tube positioned between said ends of said outer filter element, said first porous filter membrane surrounding said first perforated tube, said second porous filter membrane surrounding said second perforated tube, said perforated tubes supporting said porous filter membranes radially and maintaining said non-porous ends in spaced relation.

* * * * *